United States Patent [19]

New

[11] Patent Number: 4,627,092

[45] Date of Patent: Dec. 2, 1986

[54] SOUND DISPLAY SYSTEMS

[76] Inventor: Deborah M. New, 111 Greenbriar Drive, Waterloo, N2L 4B3, Canada

[21] Appl. No.: 465,872

[22] Filed: Feb. 11, 1983

[30] Foreign Application Priority Data

Feb. 16, 1982 [GB] United Kingdom ............... 8204506

[51] Int. Cl.⁴ .............................................. G10L 7/10
[52] U.S. Cl. ........................................ 381/48; 351/50
[58] Field of Search .............................. 381/48, 41–50, 381/56, 57; 324/77 B; 351/50, 51

[56] References Cited

U.S. PATENT DOCUMENTS

| | | | |
|---|---|---|---|
| 3,463,885 | 8/1969 | Upton | 381/48 |
| 3,723,652 | 5/1973 | Alles et al. | 381/48 |
| 3,936,605 | 2/1976 | Upton | 381/48 |
| 4,117,265 | 9/1978 | Gerlach | 381/48 |
| 4,378,466 | 5/1983 | Esser | 381/48 |
| 4,414,431 | 11/1983 | McCartney | 381/48 |

Primary Examiner—Eddie P. Chan
Assistant Examiner—John J. Salotto
Attorney, Agent, or Firm—Louis Weinstein

[57] ABSTRACT

A method and apparatus is described for modulating a color display in which the blended color is dependent upon the magnitude of N electrical signals which vary with the parameters of an audio signal. Known color pattern generators contain too many variables for a watching subject to be able to correlate them. This invention displays a single blended color which is related to the characteristics of the sound input.

11 Claims, 4 Drawing Figures

SOUND DISPLAY SYSTEMS

DESCRIPTION

1. Field of Invention

This invention concerns sound display systems which provide a visual display of sound signals, and a method and device by which a watching subject may be assisted in the analysis of sounds, particularly speech.

2. Background to the Invention

It is known to modulate a colour light display in a manner which will cause the pattern of colours to change with the amplitude of sound in different frequency bands of a sound signal. Such displays have been used for entertainment and show two or more colours fluctuating independently of each other, or they allow the colours to overlap partially producing even more fluctuating colours. The information in such a display is too dispersed for a watching subject to be able to correlate the different parts of the display.

It is also known to modulate electrical display devices such as meter displays or cathode ray tube displays and the like with electrical signals derived from a microphone or other transducer device.

Sound to sight displays for the analysis of speech for use with the deaf are generally of two types.

Some analyse speech sounds and display only certain features such as voicedness or friction, omitting finer distinctions and important transitional information.

Others display a spectrum of information but use spatial variables, such as graphic displays using one axis to display frequency and another to display amplitude or time. This presents information scattered across the field of vision and places heavy demands on a subject to relate the different areas of the display at speed.

It is an object of the present invention to provide visual information about sounds which changes as the make-up of the sound signal changes.

The system is useful in providing feedback about sounds to deaf subjects; in assisting speech training and aiding in the identification of speech problems. It also has applications in the teaching of reading by providing visual representations of spoken phonemes.

SUMMARY OF THE INVENTION

According to the present invention a method of displaying sounds visually comprises the steps of:

(a) converting sound to an audio electrical signal;

(b) processing the audio signal in M frequency bands so as to produce M separate channel signals each varying with the frequency and amplitude of the components of the original sound in the frequency band to which the signal relates;

(c) generating colour control signals from the separate channel signals, to control the blended colour and brilliance in a colour display device;

(d) supplying the colour control signals to a colour display device and;

(e) adjusting the audio signal and colour control signals so that one particular uniform colour is obtained in the display in the absence of sound which changes in the presence of sound, the particular colour change depending on relative magnitudes of the colour control signals which in turn depend on the frequency and amplitude of the components making up the sound.

The method may include setting the background colour by means of biases to the inputs of the display device.

The colour representation may be achieved by using a colour television set as a display device. In this case the method comprises the additional steps of rectifying and smoothing the colour control signals and encoding them into a VHF signal suitable for supplying to the aerial input socket of a television receiver.

The colour representation may alternatively be achieved by using an RGB monitor. In this case the colour control signals are also rectified and smoothed, but may then be supplied directly to control the colour of the monitor screen without further encoding in manner known per se.

The colours may alternatively be produced by using coloured light sources and a colour mixer such as an Ulbricht's sphere. The coloured light sources may comprise low current filament lamps or light emitting diodes with or without colour filters.

It is known to provide compression in an audio signal by various means which may include insertion of a voltage dependent resistor or signal amplitude detector in an amplier circuit. Compression improves the usefulness of this invention as it does with hearing aids.

The present method provides a display which can give continuous information about sounds in real time to a deaf subject. Accordingly a further aspect of the method consists of displaying the colour changes in a portable unit using a miniature CRT or light emitting devices and a colour mixer.

In another aspect of the invention the blended colours are displayed in a pair of spectacles.

The method can also be useful as an aid in the training of speech production if the speech or hearing of a person is impaired.

According to another aspect of the invention the colour blend produced from the audio signal is displayed in an area of a CRT which is less than the whole screen area while, simultaneously, a teaching aid is displayed in an adjoining region, such as for example a target colour to be matched.

A modification of this aspect of the invention comprises the steps of causing the said area to scroll with time so that colour changes of a speech sample appear as a succession of differently colourd bands which progressively move across or up or down the screen. By choice of decay time for the screen phosphor so the trace of each colour will remain for sufficient time on the screen to give array of colours similar to a light spectrogram.

According to a further aspect of the invention colour control signals (or the video signals or encoded signals) may be recorded and subsequently replayed at slower speeds to allow for analysis and/or assist in a hearing process.

To increase the amount of information transmitted by the display two or more partially analysed speech signals may each be used to produce colour blends in a display or displays, such as two signals one of which corresponds to the second format of speech and the other of which corresponds to the remaining formants.

Alternatively two or more signals from separate transducers may each be used to produce a colour blend in a display or displays, such as two signals one from a microphone placed in front of a speaker and one from a microphone placed on the throat of the speaker.

These two features may be employed in a development of the invention in which two colour blends one from one source and the other from another source, are separately displayed in a binocular viewer, so that they may be viewed simultaneously, one by the right and one by the left eye of a subject.

The invention allows a real-time representation of sound as a colour that is a blend of the frequencies and amplitudes of the sounds, which colour varies as the timbre of the sound varies. The colour blend is determined by the amount of each of the component colours available to produce the display.

According to another apect of the present invention a sound to sight display system comprises:

(a) a colour display device, such as a CRT in which the colour blend produced in the display is dependent upon the values of a variable parameter of each of M electrical signals supplied to N inputs thereof;

(b) a transducer for converting sound to an electrical audio signal;

(c) signal processing circuit means responsive to the audio signal for separating signal content relating to M different frequency bands present in the said audio signal;

(d) circuit means responsive to the separated signals for producing M control signals each having a parameter which varies in dependence upon the quantity of signal content within the frequency band to which it relates;

(e) circuit means for supplying the M control signals to the N inputs, and (f) means for adjusting the parameter values of the control signals so that when the amplitude of the sound signal is below a minimum value the display shows a neutral background colour; when the amplitude of the sound signal is above a maximum value a display indicating to an overload condition is made to appear; and when received sounds are between this minimum and maximum amplitude values the display shows a colour blend which changes as the sound changes.

In one embodiment the audio signal is split into three channels corresponding to high, medium and low audio frequencies and the three control signals are arranged to control the primary colour content in a colour television set such that low frequencies produce e.g. a red flourescence, medium frequencies a green flourescence, and high frequencies a blue flourescence of the CRT screen and frequencies between these would be colour blends perceived as intermediate spectral colours, such as orange or yellow. Complex sounds may produce colour blends which are not perceived as pure spectral colours and thus a vast range of colours can be produced.

The invention may employ a colour television as the colour display device, on it may use an RGB monitor or a display may be produced from filament lamps or other light sources such as light emitting diodes (LED's) with colour filters if needed and a colour mixing device. In the case of filament lamps the current requirements should be low to allow rapid responses to changes in the signal.

Means may be provided to produce higher amplification of lower volume sounds in any of several known ways as is employed in some hearing aids.

The signal splitting circuit means conveniently comprises band pass filters.

The circuit means for supplying the signals may include parameter adjusting devices. If the parameter is amplitude, then these would comprise potentiometers.

The light generated in a display may be focused in a more or less narrow beam by means of a lens.

Means may be provided to illuminate a display screen with the mixed colour.

Where the brilliance of the display is determined by a brilliance signal as in a conventional colour television receiver, a simulated brilliance signal may be generated from the three colour signals.

Where the display devices requires an encoded signal, such as a VHF signal in the case of a conventional television set, a sine wave signal may be generated and used with an encoder and modulator to produce the VHF signal required.

In any embodiment of the invention a bias signal may be provided to the inputs such that a background colour of desired brilliance and balance of the component colours is obtained for the "no sound" condition.

This background colour may be relatively dim in which event the control signals are arranged to ADD to the effect of the bias signal.

The background colour may alternatively be set at relatively high brilliance to which event the control signals are arranged to SUBTRACT component colours from the display.

The brilliance may be held constant and the colour control signals used to change the balance of the component colours in the display with changes in the balance of the content of the signals.

The device may be used in teaching or, for assisting in the analysis of sounds particularly in diagnosis of speech problems and the monitoring of speech progress. For these purposes four additional features increase the usefulness of the invention.

One is a display which appears in an area less than the total area of the display screen.

A second is a display in which means is provided:

(a) to display the colour blend on an area less than that of the whole screen;

(b) to move this display area so that its position on the screen changes progressively with time;

(c) to adjust the rate of change of position of the display area and the decay time to give a display which shows the colour change of a sample with time.

A third is a system in which means such as a video tape-recorder is provided for storage and slower replay of the colour responses to an audio sample.

A fourth is a system in which means is provided for supplying a record of colour changes such as a moving colour sensitive film progressively exposed to changing colour blends, or a device which records the colour by using pigment blends.

In a particularly preferred arrangement, the colour producing display is built into or forms part of a pair of spectacles.

Such an apparatus may comprise a group of two or more lamps capable of producing different colours such as the three primary colours, red, green and blue, and current for operating the lamps is controlled by the colour control signals.

The colour source may be located in the field of vision or conveyed into the field of vision by mirrors or lenses or fibre optics or a light scattering device.

In one such apparatus, there is provided:

(a) lamp means for introducing coloured light into the interior of the lens or lenses of a pair of spectacles;

(b) a reflecting surface around the outer rim of said lens or lenses;

(c) a light scattering device such as a roughened spot or very small hole is added to the lens near the centre of the field of vision of a subject;

(d) a reflector is located beyond the light scattering device and a convex lens between the eye of an observer, and the light scattering device.

THE DRAWINGS

The invention will now be described by way of example with reference to the accompanying drawings in which.

DETAILED DESCRIPTION OF ILLUSTRATED EMBODIMENTS

Figure 1:
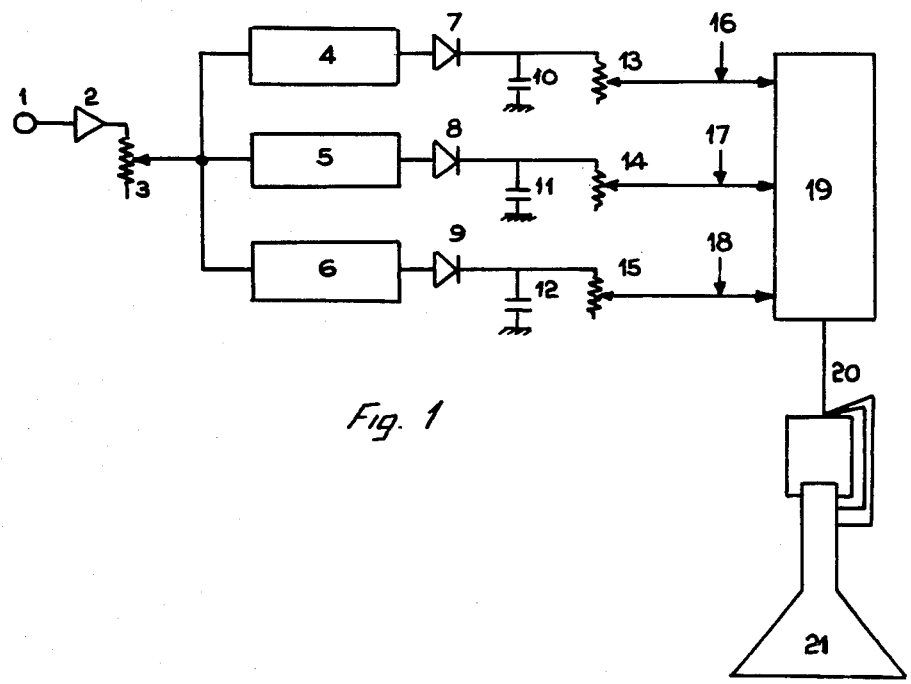
FIG. 1 is a block diagram of one embodiment of the invention in which the colour display device is a colour television.

In FIG. 1 a microphone 1 is shown supplying electrical signals to an amplifier 2 the output of which is fed through a volume control 3 to three band pass filters 4, 5, and 6. These are set to frequencies between 100 Hz and 1000 Hz, centered on 300 Hz (in the case of filter 4) between 300 Hz and 3000 Hz centered on 1000 Hz (in the case of filter 5) and betwen 1000 Hz and 7000 Hz, centered on 3000 Hz (in the case of filter 6).

The outputs of the three filters are passed through rectifying 7, 8 and 9 and smoothing 10, 11 and 12 circuits and are supplied via potentiometers 13, 14 and 15 respectively as R, G and B colour control signals. Biases are provided to each of these signals 16, 17 and 18. Typically the signals are encoded to produce an RF signal by means of the usual colour signal encoder 19 in which a sine wave is generated and the encoded signal is modulated. The output of the encoders supplied to control the brilliance and the proportions of three primary colours 20, in colour CRT 21.

Conveniently, but not necessarily, the colour control signals are rectified to produce a positive signal which adds to a positive bias set so that the screen is faintly lit with a balanced, neutral grey background colour in the absence of sound. The potentiometer is adjusted so that the screen does not respond to noise below a chosen lowest level of sound amplitude. Most commonly this will mean that the low amplitude components of speech will produce small responses and the high amplitude components of speech will produce large responses, but not large enough to saturate the system. A negative control signal can also be use to subtract colours from a bright display on an intermediate arrangement.

The potentiometers of the colour control signal outputs are adjusted to a desired balance between the colours. This will usually be such that colour control signals of equal strength give similar responses for each of the three available component colours. But colours may be given different emphasis for particular purposes, for example, it may be convenient to reduce the strength of the green signal when demonstrating the voiced, voiceless contrast.

The filter response aimed for in this embodiment is one which would give a steadily increasing signal as a pure tone rises from the lowest frequency of the pass band up to the frequency of the band's centre, then a steadily decreasing signal as the pure tone frequency rises to the highest frequency of the pass band. This would give a system in which a pure tone rising from 300 Hz to 3000 Hz would produce colour mixtures which would be perceived as pure spectral colours rising smoothly through the colour spectrum from red to deep blue. Complex audio signals give a wide range of colour blends which include nonspectral colours also.

A set of filters which approximates this performance gives a green colour in response to the speech sound /a/; a peach colour for /ɔ/; red for /u/; turquoise for /ae/; magenta for /I/; and blue for /kʃ/.

Although the colours are a single blend from moment to moment there are some sounds which typically contain a flutter or vibration which causes a change in colour blend before the whole display screen has been traversed by the cathode ray. This produces either a shimering or somewhat striated effect which is typical of that speech sound.

Although three filters have been mentioned, it is possible to use a different number of filters to produce the colour control signal. For example, in this embodiment a filter centered on 500 Hz could be divided between the red and green inputs so that signals from this filter would produce an intermediate yellow or orange response. Although frequency values have been mentioned for the filters 4, 5 and 6, the three filters may have different bands pass characteristics from those specified. This may be desirable for example for use with a subject with an uneven pattern of hearing loss, or for the training of a particular group of speech sounds.

Although low frequency sounds are associated with low frequency colours in this embodiment, this is a matter of choice and other arrangements also give comparable discriminability between sounds.

A brilliance signal may be generated by the encoder 19 from the colour control signal or it may also be generated from the audio signal.

Figure 2:
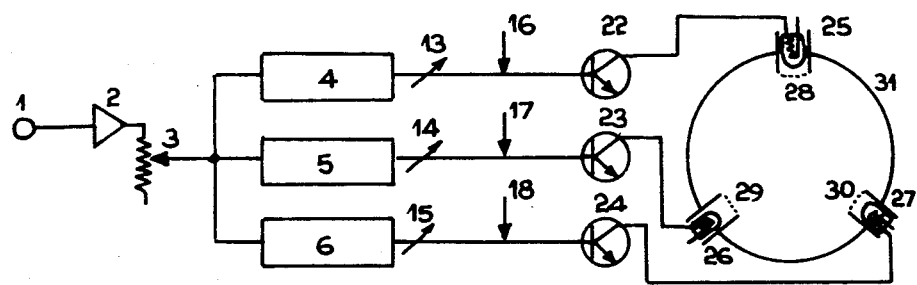
FIG. 2 is a block diagram of another embodiment in which the colour display device is a set of filament lamps and a colour mixer.

In FIG. 2, a microphone 1, is shown supplying electrical signals to an amplifier 2 the output of which is fed through a volume control 3 to three band pass filters 4, 5 and 6 which are centered on 300 Hz, 1000 Hz and 3000 Hz respectively. The outputs of the three filters are supplied via potentiometers 13, 14 and 15 respectively as red, green and blue colour control signals. Biases 16, 17 and 18 are provided to each of these signals and the signals supplied to transistors 22, 23 and 24 to control the brightness of the three component colours of the display which are produced by filament lamps 25, 26 and 27 with red, green and blue filters 28, 29 and 30 respectively. The component colours are then mixed in an Ulbricht's sphere 31.

Although three filters are described there may be a different number.

Although a one to one relationship is shown between the number of filters and the number of coloured lights in the display this may be changed. The signal from one filter may split between two lights of different colours, or one signal may supply several lights of the same colour.

Filter characteristics have been mentioned but may be changed.

Three primary colours have been mentioned but other component colours may be used. However the best range of colour blends giving the most distinction between different sounds is obtained when the available component colours are widely spaced in the colour spectrum.

The filament lamps should be of the lowest available amperage to give a fast response to changes in the audio signal.

In this embodiment the colour is mixed in an Ulbricht's sphere 31, but any other means of mixing colours may be used. The Ulbricht's sphere is described more fully with reference to FIG. 3.

Figure 3:
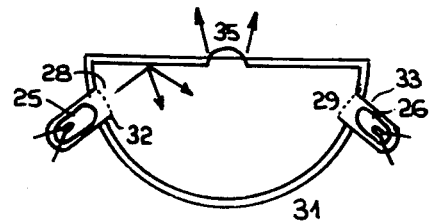
FIG. 3 shows the colour mixer in greater detail.

In FIG. 3 the Ulbricht's sphere 31 comprises a half sphere of opaque white material which is about 2.5 cm in diameter and is topped by an opaque white circular disk with a small hole in the centre of about 3 mm. diameter. Filament lamps 25 and 26 are inserted into the sphere by means of opaque white sockets 32 and 33 which are capped by colour filters 28 and 29. The sockets are directed towards the white circular disk so that light from the lamps cannot reach the hole in the circle directly. A small convex lens 35 is placed over the hole so that mixed light escaping from the sphere is directed in a more or less narrow beam.

Figure 4:
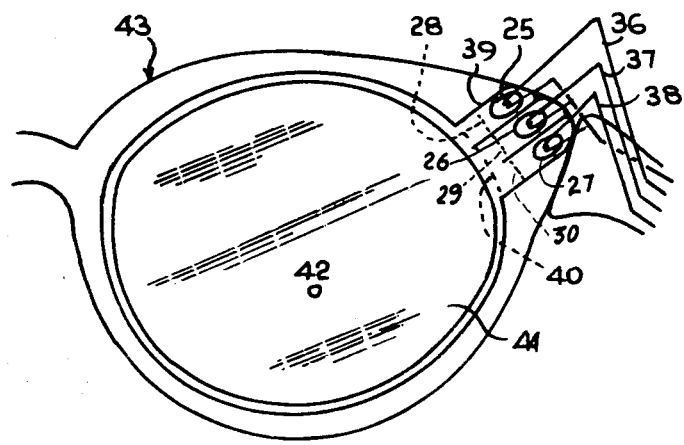
FIG. 4 shows an embodiment of the invention in which lights are built into a pair of spectacles.

In FIG. 4 the same invention is adapted for use in a pair of spectacles. Three biased colour control signals 36, 37 and 38 are supplied to three small filament lamps, 25, 26 and 27 each of which is contained in a silvered metal compartment of module 39 from which light can only escape via coloured filters 28, 29 and 30 to a translucent figments 40 of the rim of a square edged lens 41 of the spectacles. The transparent area admits the light into the interior of the lens material. The remainder of the rim of the lens is silvered and a small hole 42 of about ½ mm. is drilled through the lens at a position about 5 mm. below the usual line of vision of the subject. The spectacles are provided with a frame 43 which houses the compartments 39, for the lights and hides the translucent figment 42, for the lamps 25, 26 and 27 from direct view by the eye of the subject.

Not shown on this diagram are a small reflector placed outside the drilled hole and a small lens inside it so as to direct most of the escaping light towards the iris of the eye of a subject. These last two features are not essential, but improve the efficiency of the device.

The colour control signal produces a colour display which is, in theory, less perfectly mixed because the light can reach the light scattering device 42 directly. But in practice this is not a problem as the colours appear well mixed.

As in the embodiment shown in FIGS. 2 and 3 the biases, and the potentiometers in the system may be adjusted to vary the display. The number of lights or control signals may be varied.

In this embodiment the filter colours used are red, green and blue but these may also be changed.

I claim:

1. A method of displaying sounds visually comprising the steps of:
   (a) converting sound to an audio electrical signal;
   (b) processing the audio signal in M frequency bands so as to produce M separate signals each varying with the frequency band to which the signal relates;
   (c) generating colour control signals from the separate channel signals to control the colour blend and brilliance in a color display device;
   (d) supplying the colour control signals to a colour display device which incorporates means for displaying a substantially uniform colour resulting from the controlled blend and brilliance of the colour control signal; and
   (e) adjusting the audio signal and colour control signals so that one particular uniform colour is obtained in the absence of sound, which changes at any given instant to a different unique uniform colour in the presence of sound, the particular colour change depending on the relative magnitude of the colour control signals which in turn depend on the frequency and amplitude of the components making up the sound.

2. A method as set forth in claim 1 in which the colour control signals are encoded into a broadcast type signal for application to a colour television receiver or the like.

3. A method as set forth in claim 1 in which the background colour of the display in the absence of sound is set by means of a bias signal.

4. A method as set forth in claim 1, in which the blended colour representation of the incoming sound is achieved by using coloured light sources and a colour mixer.

5. A method as set forth in claim 1, in which the audio signal is subjected to compression so that low amplitude signals are amplified more than high amplitude signals.

6. A method as claimed in claim 1 in which the colour is displayed in a portable unit.

7. A method as set forth in claim 1 further comprising the steps of;
   (a) displaying the colour blend produced from the audio signal on a cathode ray tube in an area less than that of the whole display area of the CRT;
   (b) and changing the position of the area used for the display with time so that a progression of colour changes (if any) with time will be displayed on the screen, as a series of bands of colour.

8. A method as set forth in claim 1 in which the colour changes are recorded for replay at the reduced speed.

9. A sound to sight display system comprising:
   (a) a colour display device in which the colour blend produced in the display is dependent upon the values of a variable parameter of each of M electrical signals supplied to N inputs thereof;
   (b) a transducer for converting sound to an electrical audio signal;
   (c) signal processing circuit means responsive to the audio signal for separating signal content relating to M different frequency bands present in the said audio signal;
   (d) circuit means responsive to the separated signals for producing M control signals each having a parameter which varies in dependence upon the quantity of signal content within the frequency band to which it relates;
   (e) circuit means for supplying the M control signals to the N inputs of said colour display device which incorporates means for displaying a substantially uniform colour resulting from the controlled blend and brilliance of the colour control signals, and
   (f) means for adjusting the parameter values of the control signals so that when the amplitude of the sound signal is below a minimum value, the display shows a neutral unique uniform background colour; when the amplitude of the sound signal is above the maximum value a display indicating an overload condition is made to appear; and when received sounds are between the maximum and minimum values, the display shows a unique uniform colour blend which changes as the sound changes.

10. Apparatus as claimed in claim 9 in which the colour producing display comprises a group of two or more lamps capable of producing different colours such as three primary colours red, green and blue, and current for operating the lamps is controlled by the colour control signals.

11. The display system of Claim 9 wherein said display device comprises a pair of spectacles;

(a) M light source means for introducing differently coloured light into the interior of at least one lens of the pair of spectacles and each being coupled to receive one of said M electrical signals;
(b) a reflecting surface around the rim of the said lens;
(c) a light scattering device near the centre of the field of vision of a subject using the lens when viewed from the viewing point;
(d) a small reflector beyond the light scattering device and a convex lens between the viewing position and the light scattering device.

* * * * *